US008560972B2

(12) United States Patent
Wilson

(10) Patent No.: US 8,560,972 B2
(45) Date of Patent: Oct. 15, 2013

(54) SURFACE UI FOR GESTURE-BASED INTERACTION

(75) Inventor: Andrew D Wilson, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1745 days.

(21) Appl. No.: 10/914,922

(22) Filed: Aug. 10, 2004

(65) Prior Publication Data

US 2006/0036944 A1 Feb. 16, 2006

(51) Int. Cl.
*G06F 3/033* (2013.01)
*G06F 3/041* (2006.01)
*G06F 3/00* (2006.01)
*G06F 3/01* (2006.01)
*G09G 5/00* (2006.01)

(52) U.S. Cl.
USPC ........... 715/863; 715/700; 715/702; 345/156; 345/157; 345/158; 345/173; 345/619

(58) Field of Classification Search
USPC .......................... 715/702, 863; 882/181, 312
See application file for complete search history.

(56) References Cited

U.S. PATENT DOCUMENTS

| | | | |
|---|---|---|---|
| 4,843,568 A | 6/1989 | Krueger et al. | |
| 5,436,639 A * | 7/1995 | Arai et al. | 345/156 |
| 5,581,276 A | 12/1996 | Cipolla et al. | |
| 5,900,863 A * | 5/1999 | Numazaki | 345/158 |
| 5,966,129 A | 10/1999 | Matsukuma et al. | |
| 5,982,352 A * | 11/1999 | Pryor | 345/156 |
| 6,108,012 A | 8/2000 | Naruki et al. | |
| 6,176,782 B1 * | 1/2001 | Lyons et al. | 463/36 |
| 6,181,343 B1 | 1/2001 | Lyons | |
| 6,195,104 B1 | 2/2001 | Lyons | |
| 6,198,485 B1 | 3/2001 | Mack et al. | |

(Continued)

FOREIGN PATENT DOCUMENTS

| | | |
|---|---|---|
| EP | 1653937 A1 | 5/2006 |
| JP | 56044255 | 4/1981 |
| WO | WO 2004/051656 A1 * | 6/2004 |

OTHER PUBLICATIONS

Bastian Leibe, Thad Starner, William Ribarsky, Zachary Wartell, David Krum, Brad Singletary, and Larry Hodges, The Perceptive Workbench: Toward Spontaneous and Natural Interaction in Semi-Immersive Virtual Environments, GVU Center, Georgia Institute of Technology.*

(Continued)

*Primary Examiner* — Matt Kim
*Assistant Examiner* — Yongjia Pan
(74) *Attorney, Agent, or Firm* — Lee & Hayes, PLLC

(57) ABSTRACT

Disclosed is a unique system and method that facilitates gesture-based interaction with a user interface. The system involves an object sensing configured to include a sensing plane vertically or horizontally located between at least two imaging components on one side and a user on the other. The imaging components can acquire input images taken of a view of and through the sensing plane. The images can include objects which are on the sensing plane and/or in the background scene as well as the user as he interacts with the sensing plane. By processing the input images, one output image can be returned which shows the user objects that are in contact with the plane. Thus, objects located at a particular depth can be readily determined. Any other objects located beyond can be "removed" and not seen in the output image.

36 Claims, 15 Drawing Sheets

(56) References Cited

U.S. PATENT DOCUMENTS

| | | | |
|---|---|---|---|
| 6,269,172 B1 | 7/2001 | Rehg et al. | |
| 6,369,794 B1 | 4/2002 | Sakurai et al. | |
| 6,393,090 B1 | 5/2002 | Hsieh et al. | |
| 6,414,672 B2 | 7/2002 | Rekimoto et al. | |
| 6,466,198 B1 | 10/2002 | Feinstein | |
| 6,501,515 B1* | 12/2002 | Iwamura | 348/734 |
| 6,539,931 B2 | 4/2003 | Trajkovic et al. | |
| 6,545,670 B1 | 4/2003 | Pryor | |
| 6,600,475 B2 | 7/2003 | Gutta et al. | |
| 6,714,247 B1* | 3/2004 | Numazaki et al. | 348/370 |
| 6,795,808 B1* | 9/2004 | Strubbe et al. | 704/275 |
| 6,804,396 B2 | 10/2004 | Higaki et al. | |
| 6,888,960 B2 | 5/2005 | Penev et al. | |
| 6,950,534 B2 | 9/2005 | Cohen et al. | |
| 7,007,236 B2 | 2/2006 | Dempski et al. | |
| 7,069,516 B2* | 6/2006 | Rekimoto | 715/757 |
| 7,095,401 B2 | 8/2006 | Liu et al. | |
| 7,173,604 B2 | 2/2007 | Marvit et al. | |
| 7,225,414 B1* | 5/2007 | Sharma et al. | 715/863 |
| 7,236,162 B2* | 6/2007 | Morrison et al. | 345/173 |
| 7,256,772 B2* | 8/2007 | Morrison | 345/178 |
| 7,274,800 B2 | 9/2007 | Nefian et al. | |
| 7,372,977 B2 | 5/2008 | Fujimura et al. | |
| 7,646,372 B2* | 1/2010 | Marks et al. | 345/156 |
| RE41,449 E * | 7/2010 | Krahnstoever et al. | 701/1 |
| 7,978,184 B2 | 7/2011 | Morrison | |
| 2002/0064382 A1* | 5/2002 | Hildreth et al. | 396/100 |
| 2002/0114519 A1* | 8/2002 | Mastrianni et al. | 382/199 |
| 2003/0156756 A1 | 8/2003 | Gokturk et al. | |
| 2003/0227439 A1* | 12/2003 | Lee et al. | 345/156 |
| 2004/0001113 A1 | 1/2004 | Zipperer et al. | |
| 2004/0004600 A1 | 1/2004 | Yoneno et al. | |
| 2004/0046736 A1 | 3/2004 | Pryor et al. | |
| 2004/0155902 A1 | 8/2004 | Dempski et al. | |
| 2004/0155962 A1 | 8/2004 | Marks | |
| 2004/0169674 A1 | 9/2004 | Linjama | |
| 2004/0189720 A1 | 9/2004 | Wilson et al. | |
| 2004/0240708 A1* | 12/2004 | Hu et al. | 382/103 |
| 2005/0013477 A1* | 1/2005 | Ratti et al. | 382/154 |
| 2005/0057491 A1* | 3/2005 | Zacks et al. | 345/156 |
| 2005/0088407 A1* | 4/2005 | Bell et al. | 345/156 |
| 2005/0151850 A1 | 7/2005 | Ahn et al. | |
| 2005/0212753 A1 | 9/2005 | Marvit et al. | |
| 2005/0238201 A1 | 10/2005 | Shamaie | |
| 2005/0255434 A1 | 11/2005 | Lok et al. | |
| 2006/0007142 A1 | 1/2006 | Wilson et al. | |
| 2006/0026521 A1* | 2/2006 | Hotelling et al. | 715/702 |
| 2006/0036944 A1 | 2/2006 | Wilson | |
| 2006/0092267 A1 | 5/2006 | Dempski et al. | |
| 2006/0178212 A1 | 8/2006 | Penzias | |
| 2007/0252898 A1 | 11/2007 | Delean | |
| 2008/0036732 A1 | 2/2008 | Wilson et al. | |
| 2008/0122786 A1 | 5/2008 | Pryor et al. | |
| 2008/0192027 A1 | 8/2008 | Morrison | |
| 2008/0193043 A1 | 8/2008 | Wilson | |
| 2009/0121894 A1 | 5/2009 | Wilson et al. | |
| 2009/0278799 A1 | 11/2009 | Wilson | |

OTHER PUBLICATIONS

Brygg Ullmer and Hiroshi Ishii, The metaDESK: Models and Protoypes for Tangible User Interfaces, ACM Press, pp. 223-232.*

Jun Rekimoto and Nobuyuki Matsushita, Perceptual Surfaces: Toward a Human and Object Sensitive Interactive Display.*

Nobuyuki Matsushita, Jun Rekimoto, HoloWall: designing a finger, hand, body, and object sensitive wall, 1997, ACM Inc, Proceedings of the 10th annual ACM symposium on User interface software and technology, 209-210.*

Paul Dietz, Darren Leigh, DiamondTouch: a multi-user touch technology, 2001, ACM Inc, Proceedings of the 14th annual ACM symposium on User interface software and technology, 219-226.*

Jun Rekimoto, SmartSkin: an infrastructure for freehand manipulation on interactive surfaces, 2002, ACM Inc, Proceedings of the SIGCHI conference on Human factors in computing systems: Changing our world, changing ourselves, 113-120.*

Mike Wu, Ravin Balakrishnan, Multi-finger and whole hand gestural interaction techniques for multi-user tabletop displays, 2003, ACM Inc, Proceedings of the 16th annual ACM symposium on User interface software and technology, 193-202.*

Bastian Leibe, Thad Starner, William Ribarsky, Zachary Wartell, David Krum, Justin Weeks, Bradley Singletary, and Larry Hodges, Toward Spontaneous Interaction with the Perceptive Workbench, 2000, 12 pages.*

Christopher R. Wren, et al., Volumetric Operations with Surface Margins, IEEE Computer Vision and Pattern Recognition Technical Sketches, Dec. 2001, 4 pages, Kauai, Hawaii.

U.S. Appl. No. 12/185,166, filed Aug. 4, 2008.

U.S. Appl. No. 12/256,747, filed Oct. 23, 2008.

Ishii et al., "PingPongPlus: Design of an Athletic-Tangible Interface for Computer-Supported Cooperative Play", CHI 99, May 1999, 7 pages.

Liu et al, "Hand gesture recognition using depth data", IEEE Xplore, May 2004, 7 pages.

Office action for U.S. Appl. No. 12/490,327, mailed on Dec. 19, 2012, Wilson, "Surface UI for Gesture-Based Interaction", 9 pages.

Office action for U.S. Appl. No. 12/490,327, mailed on Jun. 21, 2012, Wilson, "Surface UI for Gesture-Based Interaction", 9 pages.

Paradiso et al., "Passive Acoustic Knock Tracking for Interactive Windows", ACM CHI 2002 Conference, Minneapolis Minnesota, Apr. 2002, 2 pages.

Paradiso et al., "Passive Acoustic Sensing for Tracking Knocks Atop Large Interactive Displays" IEEE Sensors 2002 Conference, Florida, Jun. 2002, 6 pages.

Wisneski et al., "PingPongPlus: Augmentation and Transformation of Athletic Interpersonal Interaction", ACM ISBN, Apr. 1998, 2 pages.

* cited by examiner

OUTPUT OF THE FIRST CAMERA:

OUTPUT OF THE SECOND CAMERA:

RECTIFIED FIRST INPUT:

RECTIFIED SECOND INPUT:

EDGE DETECTION ON FIRST IMAGE:                1000

EDGE DETECTION ON SECOND IMAGE:           1100

HAND ABOUT 1- 1.5 INCHES ABOVE (OR IN FRONT OF) SCREEN: ← 1400

HAND ABOUT 6 INCHES ABOVE (OR IN FRONT OF) SCREEN: ← 1500

THREE DIFFERENT PROJECTED VISUALIZATIONS OF TOUCH IMAGE:

COMPOSITE IMAGE OF 2 INPUT IMAGES: LEFT UNDISTORTED IMAGE IN
THE GREEN CHANNEL, RIGHT UNDISTORTED IMAGE IN RED CHANNEL

PROJECTION OF TOUCH IMAGE ILLUSTRATES ALIGNMENT
OF TOUCH IMAGE WITH PHYSICAL DISPLAY

AN INTERACTIVE DRAWING APPLICATION WITH DECAYING
STROKES AND CYCLING COLORS.

SURFACE UI FOR GESTURE-BASED INTERACTION

TECHNICAL FIELD

The present invention relates generally to user interface (UI) and display technology and in particular, to projecting an image onto a plane surface which effectively creates a UI to facilitate gesture-based interaction with such surface.

BACKGROUND OF THE INVENTION

In the last few years alone, computing demands have increased dramatically. Such significant increases have given rise to a vast amount of new computing technologies. For example, a keyboard, mouse, or some other pointing (e.g., a stylus) used to be required for data entry as well as data manipulation. However, nowadays, users also have the option to utilize a variety of other means to enter, access, and/or manipulate data displayed on or stored in a computer. One primary example is touch screen technology. In general, a touch screen is an input device that allows users to operate a computer by simply touching the display screen.

Unfortunately common touch screen technologies are limited in capability. For example, most are not able to track more than a small number of objects on the screen at a time, and typically they report only the two dimensional (2D) position of the object and no shape information. This can be due in part to superficial limitations of the particular hardware implementation, which in turn are driven by the emphasis on emulating pointer input for common GUI (graphical user interface) interactions. Typically, today's applications are only able to handle one 2D pointer input.

Recently, a number of systems have introduced the concept of imaging touch screens, where instead of a small list of discrete points, a full touch image is computed, whereby each 'pixel' of the output image indicates the presence of an object on the touch screen's surface. The utility of the touch image thus computed has been demonstrated in gesture-based interactions for application on wall and table form factors. For example, the DiamondTouch system uses horizontal and vertical rows of electrodes to sense the capacitively coupled touch of the users' hands at electrode intersections. (Dietz, P. H., D. L. Leigh, DiamondTouch: A Multi-User Touch Technology. in *ACM Symposium on User Interface Software and Technology (UIST)*, (2001), 219-226).

MetaDesk (see Ullmer, B., H. Ishii, The metaDESK: Models and Prototypes for Tangible User Interfaces. in *ACM Symposium on User Interface Software and Technology*, (1997), 223-232), HoloWall (see Matsushita, N., J. Rekimoto, HoloWall: Designing a Finger, Hand, Body and Object Sensitive Wall in *ACM Symposium on User Interface Software and Technology (UIST)*, (1997)) and Designer's Outpost (see Klemmer, S. R., M. W. Newman, R. Farrell, M. Bilezikjian, J. A. Landay, The Designer's Output: A Tangible Interface for Collaborative Web Site Design in *ACM Syposium on User Interface Software and Technology*, (2001), 1-10)) each use video cameras and computer vision techniques to compute a touch image. These systems permit simultaneous video projection and surface sensing by using a diffusing screen material which, from the camera view, only resolves those objects that are on or very near the surface. The touch image produced by these camera-based systems reveals the appearance of the object as it is viewed from behind the surface.

Thus, there remains a need to further develop and improve touch screen technology for better viewing quality and for greater flexibility regarding an object's distance from the screen material.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and method that can compute an image of any objects touching a surface of a plane or display space. More specifically, the systems and methods can facilitate determining which objects in view of the plane exist at a given depth from the plane or display space. This can be accomplished in part by employing a system configuration comprising at least two cameras and a vertical or horizontally located sensing plane or display surface located in front of the cameras. The cameras can be directed toward the plane or display screen/surface. A user interacting with the sensing plane can be positioned on the opposite side of the plane.

In one aspect of the invention, the user can provide input with respect to the plane by touching or otherwise contacting the plane. Input given within a close proximity of the plane can also be "entered" for image processing as well. The cameras can be triggered to capture images or snapshots of the input (input images) to ultimately determine and generate a touch image updated in real-time. The touch image can include objects in contact with the plane and can exclude any background scenery. In particular, each camera can acquire an input image of the plane whereby any visible object in that plane may be included in the image.

To obtain a touch image from the input images, image processing techniques can be utilized to combine the input images. In particular, each camera provides an input image comprising one or more objects in a scene. As will be described in greater detail below, lens distortion can be removed from each input image. In addition, each input image can be rectified such that the four corners of the plane region coincide with the four corners of the image.

Following, at least one of several image differencing procedures can be employed to highlight the contours or edges of the objects in the images. According to one approach, edge detection can be applied to the rectified images to yield corresponding edge images. Thereafter, the two edge images can be multiplied pixel-wise, for instance. The resulting image reveals where the edge contours of the two input images overlap. Such overlapping contours can indicate or identify objects that are in contact with the plane.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
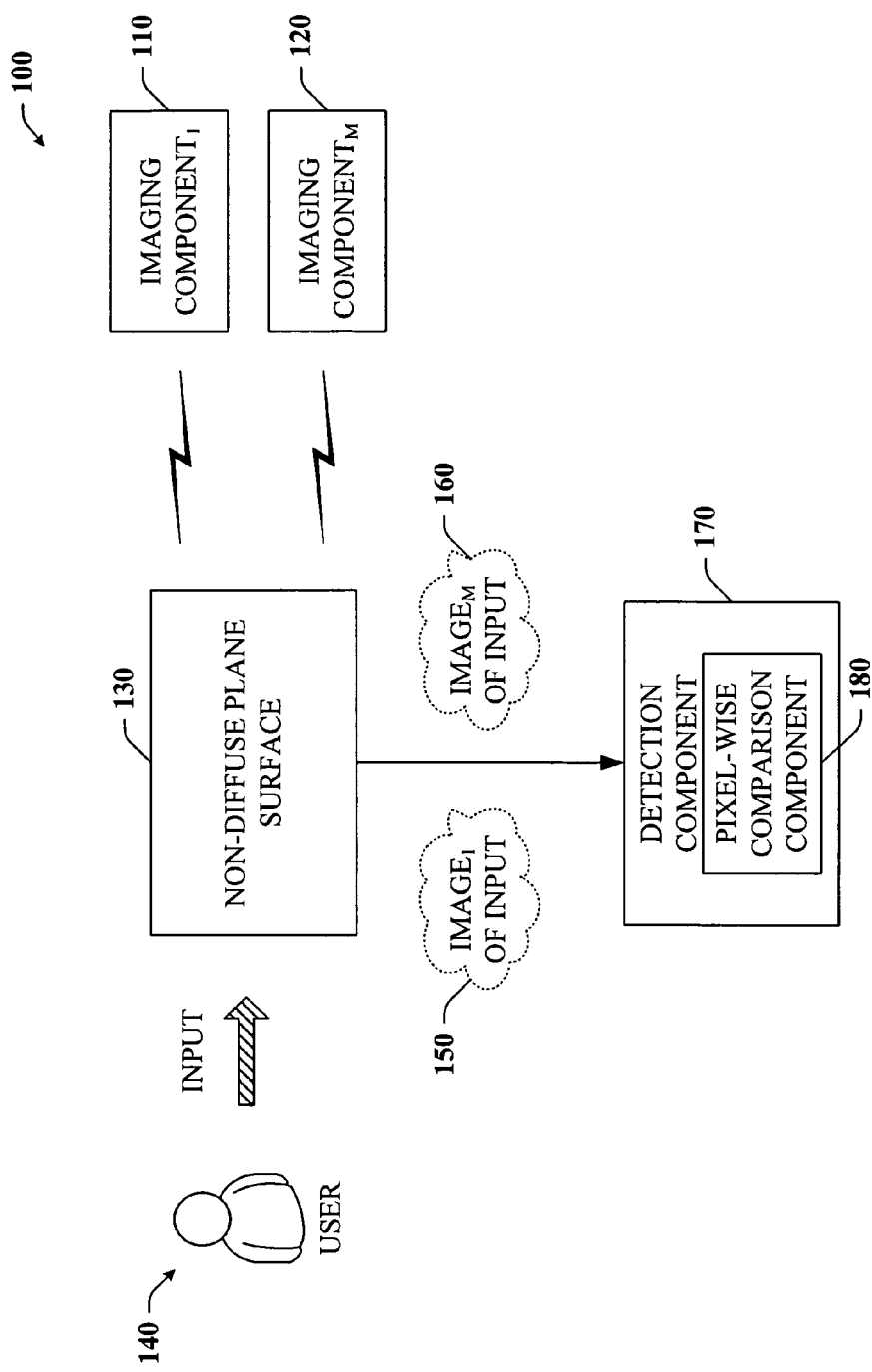
FIG. 1 is a high level, block diagram of an object sensing system that facilitates sensing objects on a surface or plane of space in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

As described in greater detail in FIGS. 1-19, infra, the present invention relates to a unique input architecture and process that facilitate gesture-based interaction with a user interface (UI) device. More specifically, the invention provides a system and method that involve computing a high resolution image of objects which are determined to be in contact with a sensing plane (e.g., display screen surface). Unlike conventional systems, the present invention employs an at least partially transparent or non-diffuse sensing plane. Due to the transparency of the plane, each camera view can show the objects on the plane as well as objects beyond the surface of the plane such as background objects and the user (interacting with the plane). When employing multiple cameras, the system can readily determine if a given object is on or in contact with the plane or at a particular distance from it (e.g., at a particular depth).

Moreover, the image processing system presented herein acts as a filter to remove objects not on the sensing plane, producing a touch image which shows objects that are on the plane. Thus, the present invention provides sensing capabilities that extend beyond traditional camera-based touch screen systems. Traditional systems attempt to identify or determine the depth of objects in a given scene, whereas here, the systems and methods facilitate viewing all objects at a given depth.

Furthermore, conventional touch screen technology is typically limited to determining one or two discrete points (e.g., (x, y)) of contact. Some advancements expanding beyond discrete points of contact have been made, however, they too are limited in image composition and resolution. To compensate for the lack of image quality and detail, conventional systems often make use of bounding boxes to assist a user in determining where the desired subject matter or object is located in the image.

By contrast, the present invention can compute and return an output image to the user having a relatively higher resolution than conventional image or point projections. As a result of the advanced quality and detail of the present output images, they can be subsequently employed as input for additional applications. For example, interpretation processes can take the output image and use it as input to determine the shape of the objects (in the output image) in contact with the screen and then take appropriate action.

Referring now to FIG. 1, there is a general block diagram of an object sensing system 100 that facilitates gesture-based interaction with computing devices in accordance with an aspect of the present invention. The system 100 comprises at least two imaging components 110, 120 (e.g., IMAGING COMPONENT$_1$ and IMAGING COMPONENT$_M$, where M is an integer greater than 1) positioned behind a non-diffuse sensing plane 130 (or screen surface) and opposite from a user 140. The imaging components (110, 120) can be mounted or otherwise positioned such that each can see all four corners of the plane or screen 130.

The user can provide input with respect to the system 100 by placing one or more objects in contact with or within a proximal distance to the plane 130. Each imaging component can then capture an input image (e.g., first 150 and second 160 input images, respectively). Following, a detection component 170 can process the images to detect and/or determine the shape and/or contour of the objects in each of the input images to ultimately compute a touch image (output image). In particular, the detection component 170 can comprise a pixel-wise comparison component 180 that compares pixels between at least two images to determine which pixels are located in the same positions in each image. Matching or overlapping pixels can remain while non-overlapping pixels can be essentially removed. A "final" touch image can be generated having only the matching or overlapping pixels included therein.

In addition, the detection component can include a variety of sub-components (not shown) to facilitate computing the output image. In particular, sub-components pertaining to lens distortion correction, image rectification, and object shape identification can be employed to generate the output image. Further discussion with respect to the functionalities of these sub-components can be found, infra, in FIGS. 3 and 4.

Because some objects placed near the plane surface can be captured by the imaging components as well as those objects in contact with the surface, depth measurements may be considered when computing the output or touch image. Depth information can be computed by relating binocular disparity to the depth of the object in world coordinates. Binocular disparity refers to the change in image position an object undergoes when viewed at one position compared to another. That is, the displacement of the object from one view to the other is related to the depth of the object.

In computer vision, there is a long history of exploiting binocular disparity to compute the depth of every point in a scene. Such depths from stereo algorithms are typically computationally intensive, can be difficult to make robust, and can constrain the physical arrangement of the cameras. Often such general stereo algorithms are applied in scenarios that in the end do not require general depth maps. In the present invention, the interest rests more in the related problem of determining what is located on a particular plane in three dimensions (the display surface) rather than the depth of everything in the scene.

Figure 2:
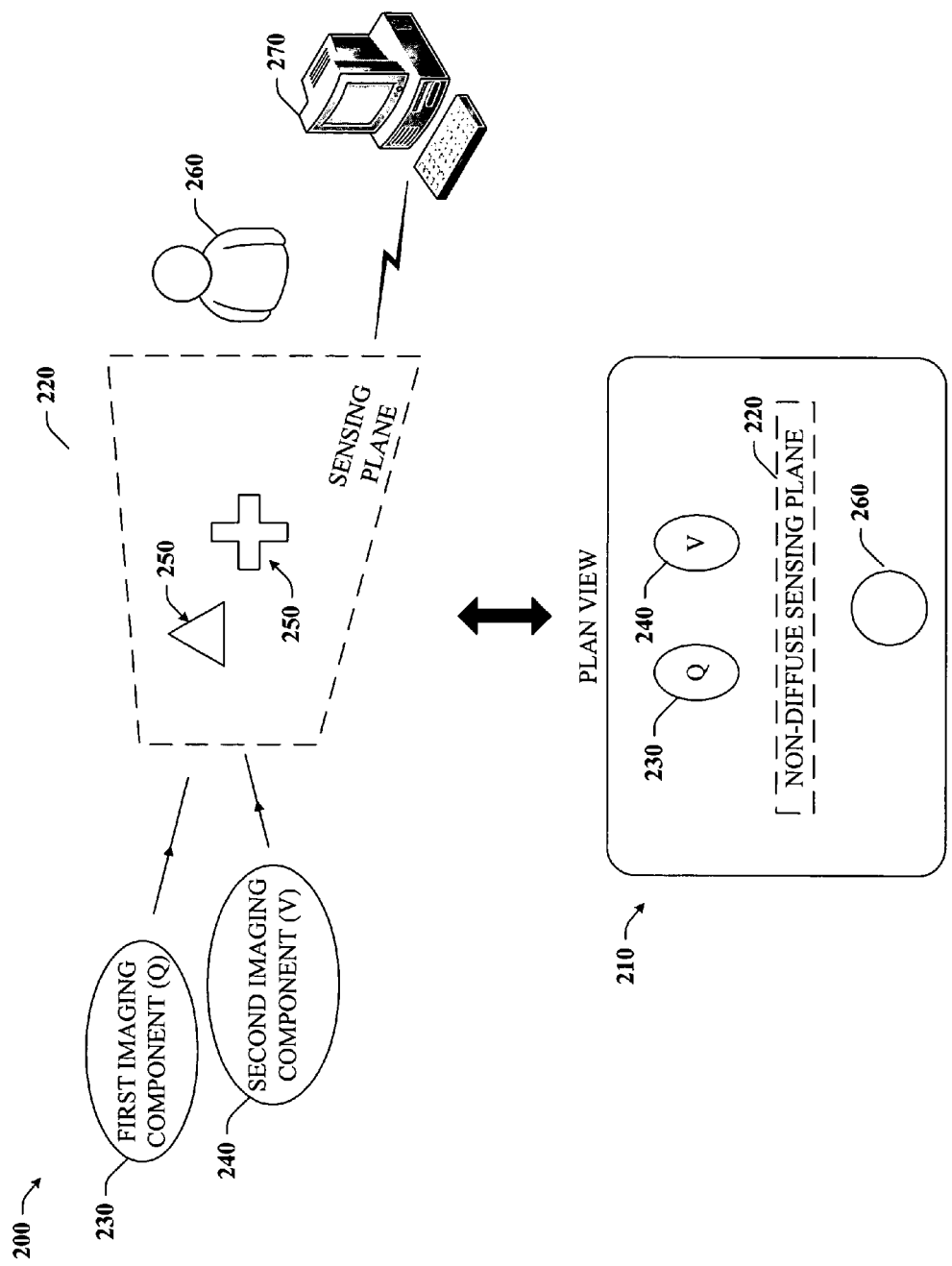
FIG. 2 is a schematic block diagram of an object sensing system configuration in accordance with an aspect of the present invention.

Referring now to FIG. 2, there is illustrated a schematic diagram of an object sensing system 200 viewed from the side or from above (e.g., plan view 210) that is configured to facilitate gesture-based interaction in accordance with an aspect of the present invention. The system 200 comprises a sensing plane 220 that can be a large sheet of acrylic plastic mounted vertically as shown. Behind the sensing plane 220, first (Q) 230 and second (V) 240 imaging components can be placed to look through the plane 220. The sensing plane can function as a screen onto which graphics 250 are projected or other objects 250 are placed. It may also serve to demarcate a sensing region in "space".

Alternatively or in addition, the sensing plane 220 can be positioned horizontally similar to a table configuration. When positioned horizontally, the plane 220 or sheet can support the placement of objects on the upper side of the sensing plane opposite from the first and second imaging components 230, 240. In either configuration, a user 260 is situated opposite from the imaging components 230, 240.

The two imaging components 230, 240 can be interfaced with a computer (PC) 270 that can acquire images from each imaging component at about 30 Hz, for example. This as well as any other image processing operation(s) detailed herein can run in real-time on an Intel® Pentium 4 or similar processor and/or on a consumer-grade video card.

Figure 3:
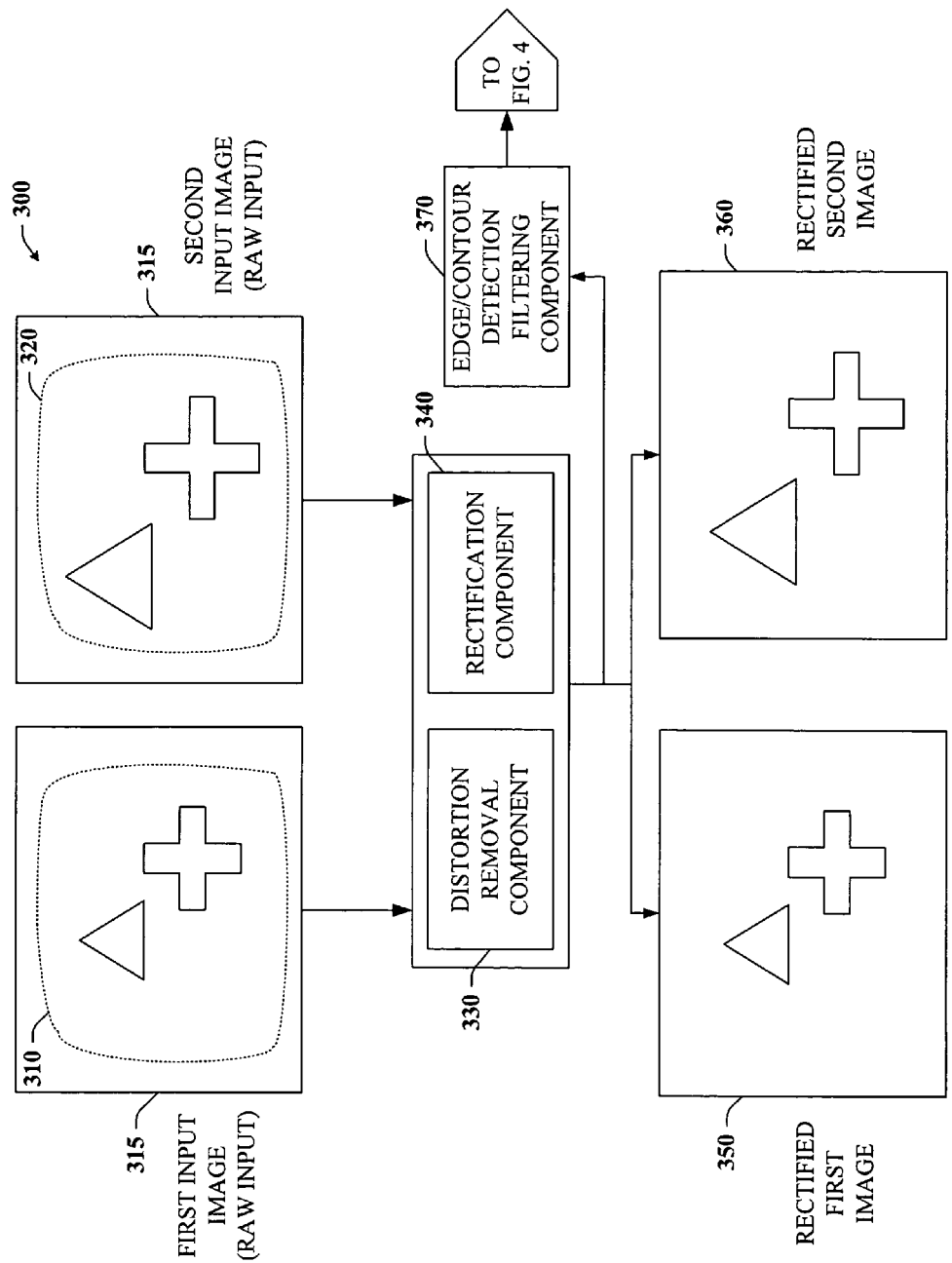
FIG. 3 is a schematic block diagram demonstrating the image processing of input images in accordance with an aspect of the present invention.

Turning now to FIG. 3, there is depicted a schematic diagram 300 demonstrating the application of one or more image processing phases to at least one input image (e.g., raw input). The resulting projections (e.g., output image(s)) can be computed to indicate where objects are in contact with the sensing plane 220 with respect to each imaging component. For instance, imagine that a first input image 310 as acquired from a first imaging component (e.g., 230 in FIG. 2) is shown with respect to a sensing plane 315. Similarly, a second input image 320 acquired from a second imaging component 240 is shown with respect to the sensing plane 315. The sensing plane 315 can comprise a display screen such as a DNP HoloScreen, which is transparent, yet allows the display of a projected image.

Because the first and second input images are essentially raw (input) data, they may likely exhibit undesirable effects from the cameras that can interfere with accurately computing the output or touch image. Lens distortion is one type of camera effect. Hence, any such undesirable distortion can be removed from each input image by way of a distortion removal component 330 (e.g., FIG. 16, at 1620, infra). In the resulting touch image, straight lines in the world appear straight in the image. Wide angle lenses can be employed to construct a more compact configuration; however, lens distortion imparted by the use of such wide angle lenses should be removed. Given the lens distortion parameters, each input image can be undistorted at least in part by bilinear interpolation.

At or about the same time of removing the lens distortion, the image can be rectified by a rectification component 340 such that the four corners of the sensing plane (e.g., four corners of acrylic sheet) coincide with the four corners of the image. Rectification of each input image involves transforming the image from the first imaging component (left camera—$I_{left}$) and the image from the second imaging component ($I_{right}$). Thus, points $I_{left}$ (x, y) and $I_{right}$ (x, y) in the transformed images refer to the same physical point on the sensing plane (or display surface). In addition, this rectification transform can be such that point (x, y) may be trivially mapped to real world dimensions (e.g., inches) on the display surface. For both transform scenarios, it suffices to find the homography from each imaging component to the display surface. In particular, each input image can be warped to the sensing plane 315 or display surface to obtain the one-to-one correspondence of physical points. This can be obtained during a manual calibration phase. Unlike the present invention, conventional imaging and/or segmentation techniques rectify one image to another which can have adverse effects when registering with a plane or display surface to perform tracking or object selection operations.

As illustrated in FIG. 3, rectified first 350 and second 360 images no longer exhibit any substantial amount of lens distortion and have been rectified to match the four corners of each input image to the four corners of the sensing plane 315. The four corners of the plane or display screen 315 can be located in each view (e.g., at least first and second imaging component views) at least in part by manual calibration. Parameters for the lens distortion correction step and the rectification step can be collected in an offline procedure and then can be stored on disk. Following, the rectification parameters can remain valid until the imaging components change positions or are moved.

Together with the lens distortion correction, the rectification transform as specified completes the homography from camera view to display space. It should be understood that the lens distortion correction and projective transform into a single nonlinear transformation on the image can be combined and/or performed simultaneously, thus requiring only one re-sampling of the image. Alternatively, the lens distortion removal and the rectification process can be performed separately from one another. Furthermore, this entire calculation can be performed on a graphics processing unit (GPU), where the transformation can be specified as a mesh.

After rectification, the same point (x, y) in both $I_{left}$ and $I_{right}$ refer to the same point on the display surface. Thus, if some image feature f is computed on $I_{left}$ and $I_{right}$ and $f_{left}$ (x,y)≠$f_{right}$ (x,y), it can be concluded that there is no object present at the point (x, y) on the display. The touch image can be computed by performing pixel-wise comparisons (e.g., pixel-wise multiplication) of the left and right images (e.g., at least two images). This is essentially equivalent to performing standard stereo-based matching where the disparity is constrained to zero, and the rectification process serves to align image rasters.

Figure 16:
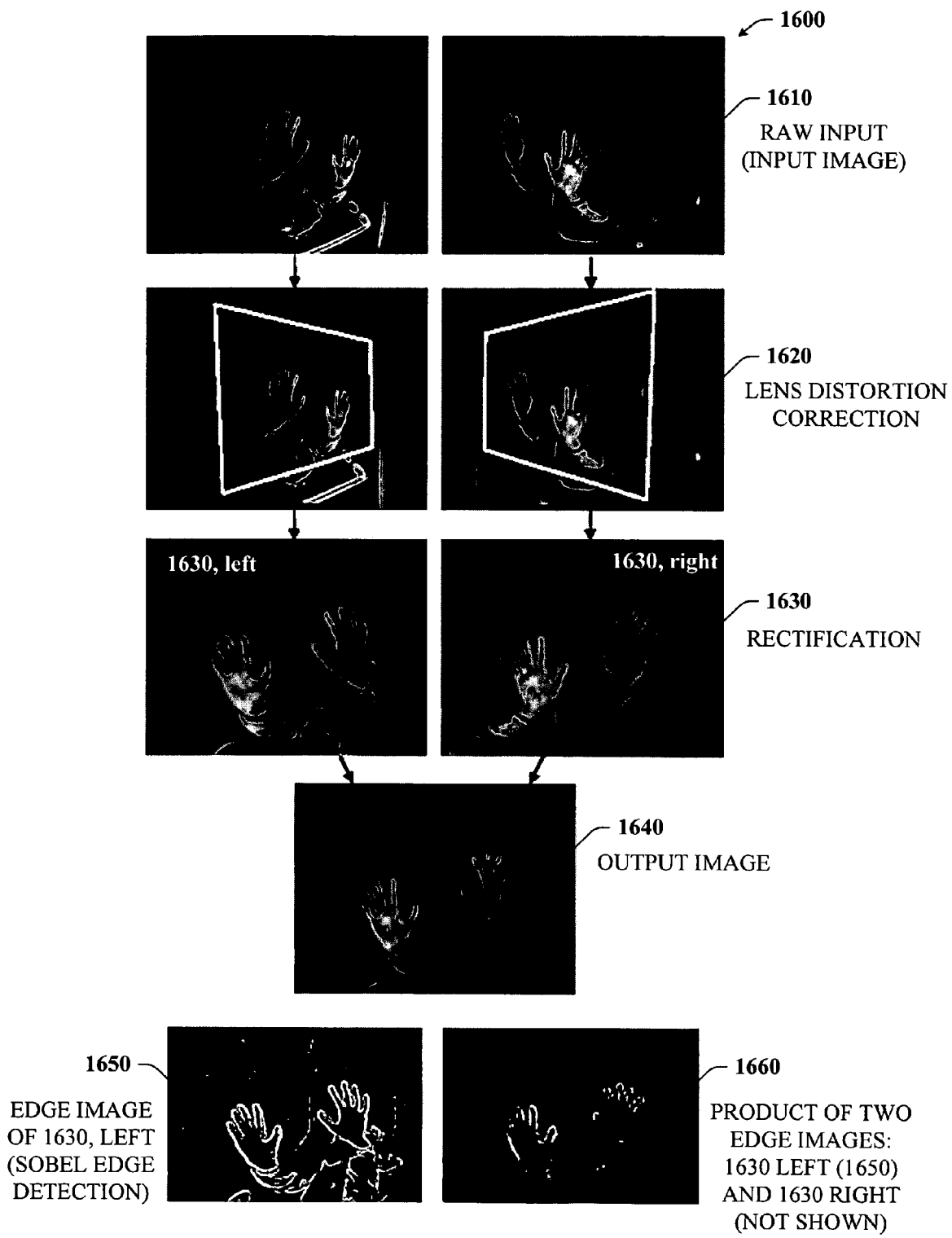
FIG. 16 illustrates an actual sequence of exemplary images demonstrating the generation of a touch image in accordance with an aspect of the present invention.

In the case where a strong infrared (IR) illuminant is available, and a user or system desires to identify hands and other IR reflective materials on the display surface, it may suffice to pixel-wise multiply the (two) rectified images. Regions which are bright in both images at the same location can survive multiplication. An exemplary resulting image is shown in FIG. 16, infra, at 1640. It should be appreciated that it is possible to implement this image comparison as a pixel shader program running on the GPU.

As with traditional stereo computer vision techniques, it can be possible to confuse the image comparison process by presenting a large uniformly textured object at some height above the display. Indeed, the height above the surface at which any bright regions are matched can be related to the size of the object and to the "baseline" (e.g., the distance between the cameras). For the same size object, larger baselines result in fusion at a smaller height above the surface, therefore allowing a finer distinction as to whether an object is on the display, or just above the display. Similarly, it is possible to arrange two distinct bright objects above the display surface such that they are erroneously fused as a single object on the surface.

More sophisticated feature matching techniques may be used to make different tradeoffs on robustness and sensitivity. For example, one approach is to first compute the edge map of the rectified image before multiplying the two images. Still referring to FIG. 3, this can be performed by an edge/contour detection filtering component 370. Only edges which are present in the same location in both images can survive the multiplication. This phenomenon is further illustrated in a schematic diagram 400 in FIG. 4.

Figure 4:
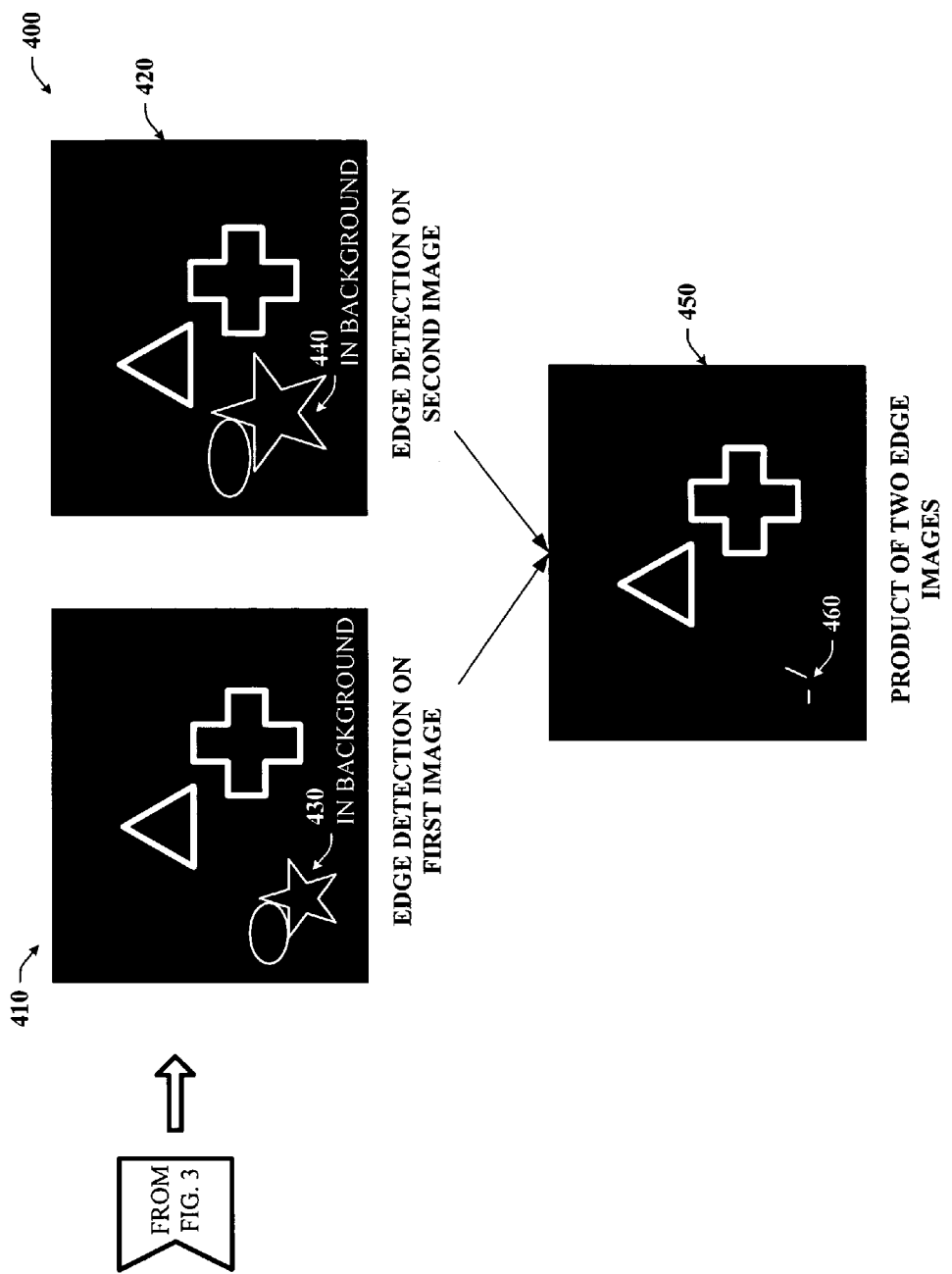
FIG. 4 is a schematic block diagram of an edge detection system applied to the input images of FIG. 3 in accordance with an aspect of the present invention.

In FIG. 4, there are illustrated schematic images (e.g., a first rectified image 410 and to a second rectified image 420) to which edge detection has been applied. The use of edge images takes advantage of the typical distribution of edges in the scene, in which the accidental alignment of two edges is unlikely. Accidental alignment can refer to the tendency for any random collection of edges from a random natural scene to line up. For example, objects 430 and 440 appear perhaps in the background scenery and hence, are captured in different locations in the two images by the respective imaging components. Consequently, pixel-wise multiplication of the two images (410 and 420) effectively "eliminates" most of the objects 430, 440 from the resulting touch image 450—except where there is accidental alignment of background edges 460. Thus, large uniform bright objects (e.g., sheet of white paper) are less likely to be matched above the surface, since the edges from both views will not overlay one another. In the case of using edges, it is possible and perhaps desirable to reduce the baseline, resulting in better overall resolution in the rectified images due to a less extreme projective transform. Similarly, motion magnitude, image differences and other features and combinations of such features may be used, depending on the nature of the objects placed on the surface, the desired robustness, and the nature of subsequent image processing steps.

Though not depicted in the figure, a further image normalization process may be performed to remove effects due to the non-uniformity of the illumination. The current touch image may be normalized pixel-wise by $$I_{normalized}(x, y) = \frac{I_{product}(x, y) - I_{min}(x, y)}{I_{max}(x, y) - I_{min}(x, y)}.$$

Minimum and maximum images $I_{min}$ and $I_{max}$ may be collected by a calibration phase in which the user moves a white piece of paper over the display surface. This normalization step maps the white page to the highest allowable pixel value, corrects for the non-uniformity of the illumination, and also captures any fixed noise patterns due to IR sources and reflections in the environment. After normalization, other image processing algorithms which are sensitive to absolute gray level values may proceed. For example, binarization and subsequent connected components algorithm, template matching and other computer vision tasks that rely on uniform illumination.

It should be noted that the sensing or touch plane can be arbitrarily defined to coincide with the display. It is possible to configure the plane such that it lies at an arbitrary depth above the display. Furthermore, multiple such planes at various depths may be defined depending on the application. Such an arrangement may be used to implement "hover", as used in pen-based models of interaction. In addition, the image rectification and image comparison processes do not require the physical presence of the display. In fact, it is possible to configure various aspects of the present invention to operate without a display screen (e.g., DNP HoloScreen), in which case the "touch" interaction is performed on an invisible plane in front of the user. In this case, it may be unnecessary to perform imaging in IR.

Figure 5:
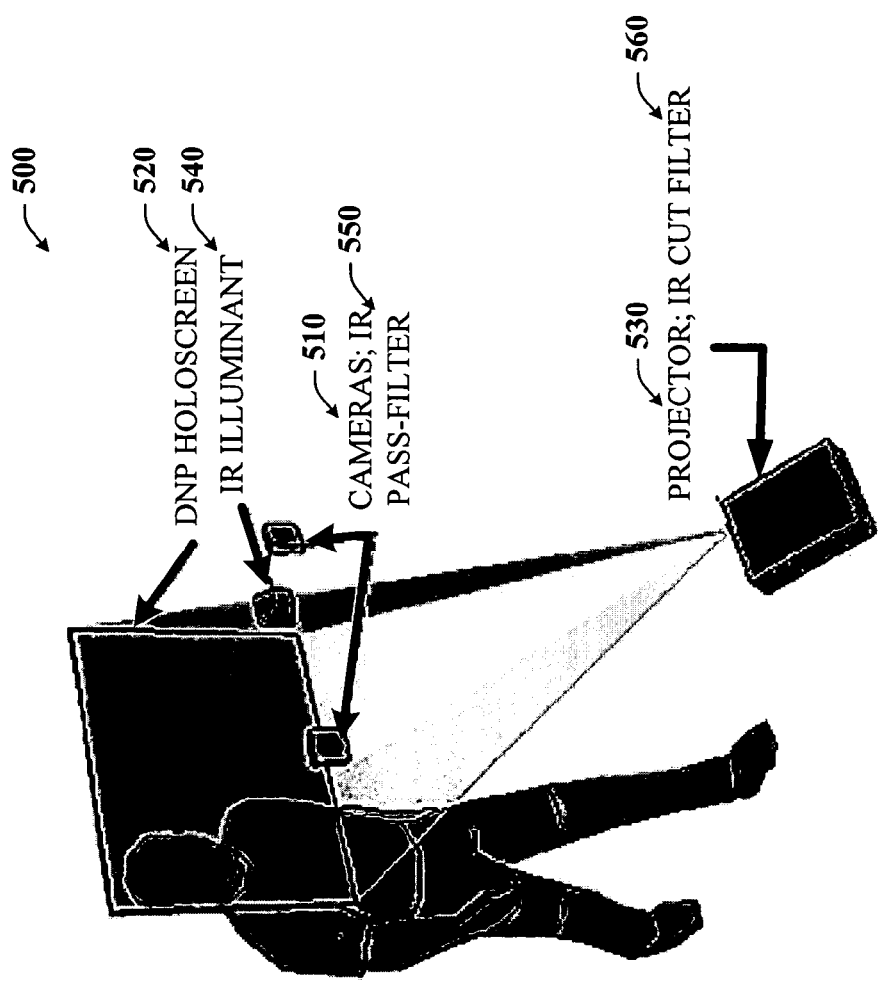
FIG. 5 is an exemplary physical configuration of an object sensing system that facilitates gesture-based interaction with computing devices in accordance with an aspect of the present invention.

Turning now to FIG. 5, there is illustrated an exemplary physical configuration for a touch screen imaging system 500 in accordance with an aspect of the present invention. The system 500 comprises a pair of commonly available Firewire web cameras 510 which can be mounted behind the display surface such that each camera can see all four corners of the display. As discussed above in FIGS. 3 and 4, the importance of the distance between the cameras affects the baseline measurement and can eventually affect accurately determining whether an object is on the display screen or plane or a distance therefrom.

The system 500 also employs a DNP HoloScreen material 520 that can be applied to a rear surface of the acrylic display surface. The HoloScreen is a special refractive holographic film which scatters light projected from the rear at a particular incident angle. The material is transparent to all other light, and so is suitable for applications where traditional projection display surfaces would be overwhelmed by ambient light. Typical applications include retail storefronts, where ambient light streaming through windows precludes traditional rear-projection screens. Additionally, the screen is transparent in the near-infrared range. Due to the transparency of the HoloScreen material, the cameras can actually see through the material with a sufficient amount of illumination. Thus, if a user is interacting with the surface, the cameras can see the user's face or some part thereof and then can employ other recognition techniques such as face recognition and/or face tracking to identify the user or to determine a quantity of users on the other side of the screen. Furthermore, the UI can be automatically altered based on any one of those findings (e.g., UI can change look or functionalities based on user).

According to manufacturer's instructions, a projector 530 can be mounted such that the projected light strikes the display at an angle of about 35 degrees. In a typical vertical, eye-level installation, this configuration does not result in the user looking directly into the "hot spot" of the projector. In fact, many projectors are not able to correct for the keystone distortion when the projector is mounted at this extreme angle. In the present invention, the NVKeystone digital keystone distortion correction utility that is available on NVidia video cards can be utilized.

Experience with the HoloScreen material suggests that while the light reflected back from the rear of the screen is significantly less than the light scattered out the front, the projected image may interfere with the image captured by any visible light-based cameras situated behind the display. In the present invention, difficulties with visible light reflections can be mitigated or avoided by conducting image-based sensing in the infrared domain.

An IR illuminant 540 can be placed behind the display to illuminate the surface evenly in IR light. Any IR-cut filters in the stock camera can be removed, and an IR-pass filter 550 can be applied to the lens. If necessary, an IR-cut filter 560 may be applied to the projector. By restricting the projected light to the visible spectrum, and the sensed light to the IR spectrum, the resulting images from the camera do not include artifacts from projected light reflected backwards from the HoloScreen film. In some cases, an anti-reflective coating may be applied to the display surface which would allow the cameras to sense visible light and perhaps eliminate the need for a separate illuminant. When mounting the display horizontally to make a table-like configuration, a "short throw" projector such as the NEC WT600 may be desirable.

The HoloScreen display material is unique in that can support video projection and is nearly transparent to IR and visible light. The basic image processing system described herein takes advantage of this fact in the placement of the cameras behind the display. This placement provides a good view of the underside of the objects placed on the display surface. The transparency of the display surface may be exploited to create high resolution scans of documents and other objects placed on the display surface.

A high resolution still digital camera or CMOS video camera may be placed behind the display to acquire high resolution images of the objects on the display surface. This camera can capture images in the video spectrum (no IR-pass filter). In such a configuration it may be beneficial to use the touch image computed from the IR cameras to perform detection and segmentation of objects of interest, and limit the projection of visible light onto the area of interest. For example, an image processing algorithm may detect the presence of a letter-sized piece of paper on the display surface.

Furthermore, the algorithm can remove any projected graphics under the presented page to enable a clear visible light view, and can trigger the acquisition of a high resolution image of the display surface. The detected position, size, and orientation of the page may then be used to automatically crop, straighten, and reflect the high resolution scan of the document. The ability to create high resolution surface scans of documents and other objects may play an important role in business and productivity oriented applications for smart surfaces such as interactive tables and smart whiteboards.

Conventional systems such as the MetaDesk, HoloWall, and Designer's Outpost all use diffusing projection surfaces to facilitate projection and sensing algorithms. Such diffusing surfaces severely limit the ability of these systems to acquire high resolution imagery of objects on the surface. In particular, diffuse materials limit the sharpness of the captured text or image.

Finally, a microphone (not shown) can be rigidly attached to the display surface to enable the simple detection of "knocking" on the display. Except for the microphone, there are no wires attached, making the subject touch screen imaging system more robust for public installation. To further improve communication between users, more than one of the subject (remote) image processing systems can be connected via the Internet and also share a window or display to essentially create a shared imaging/interaction space with at least one other user.

Referring now to FIGS. 6-12, there are illustrated a sequence of exemplary views demonstrating the use or employment of an object sensing system in accordance with the several different aspects of the present invention. In the particular configuration employed to generate the following images, two cameras are positioned behind a HoloScreen display material. The HoloScreen display is vertically located between a user and the two cameras such that the cameras can see and capture the user's input with respect to the display (see e.g., FIGS. 2 and 5).

Figure 6:
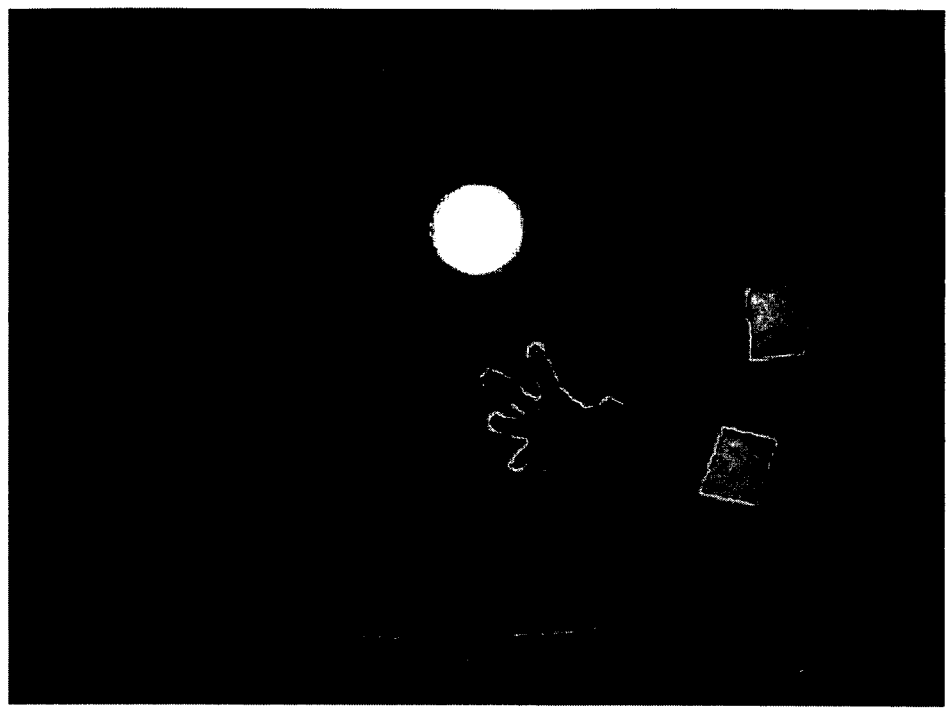
FIG. 6 is an actual, exemplary input image (first image) as acquired from a first camera in accordance with an aspect of the present invention.
Figure 7:
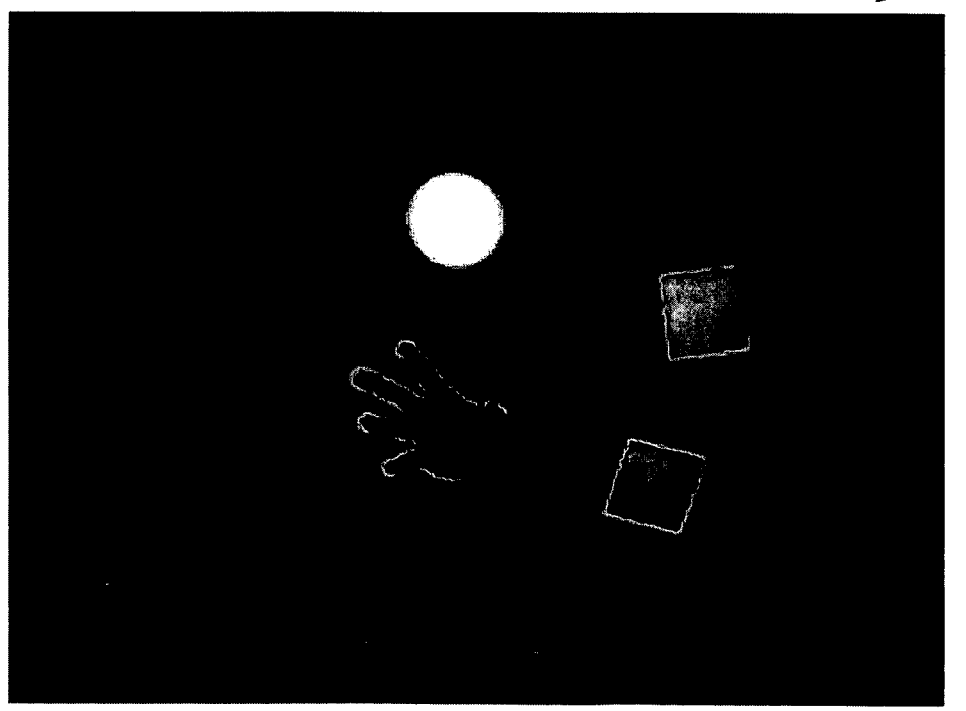
FIG. 7 is an actual, exemplary input image (second image) as acquired from a second camera in accordance with an aspect of the present invention.

Beginning with FIGS. 6 and 7, output 600, 700 (e.g., raw input images) of a first and second camera are shown. In particular, the input images reflect that objects (circle and square objects) as well as a user's cupped hand appear to be contacting the sensing plane or display screen surface. In addition, other objects appear in the images as well and it can be difficult to readily determine which objects are in contact with the touch display or plane. The raw input images also display lens distortion when compared to FIGS. 8 and 9, respectively.

Figure 8:
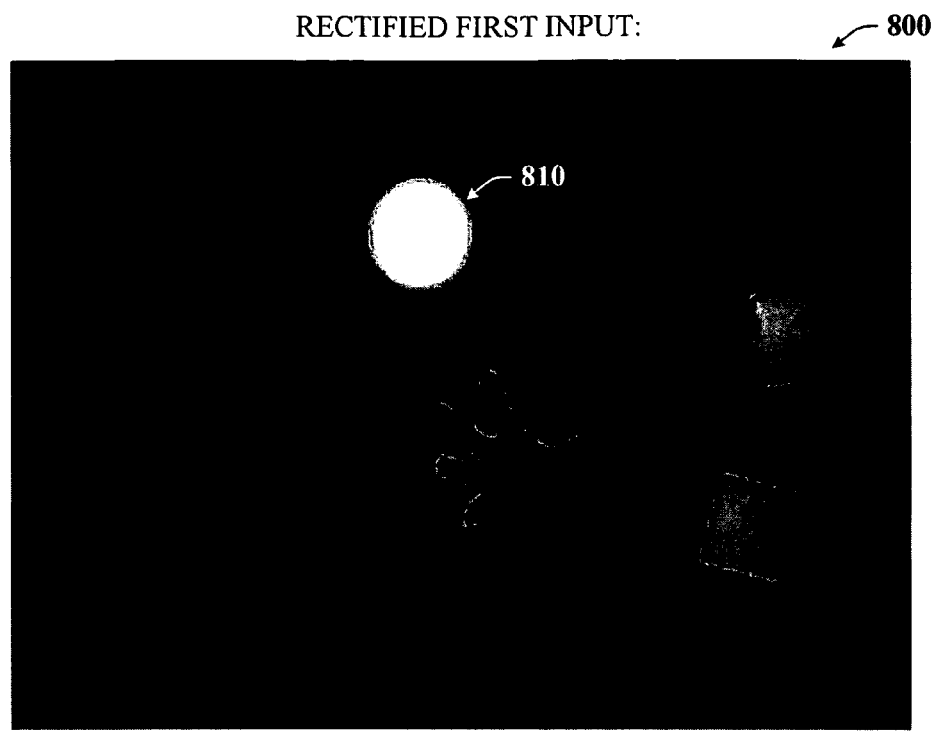
FIG. 8 is an actual, exemplary rectified image—first image as acquired from a first camera—in accordance with an aspect of the present invention.
Figure 9:
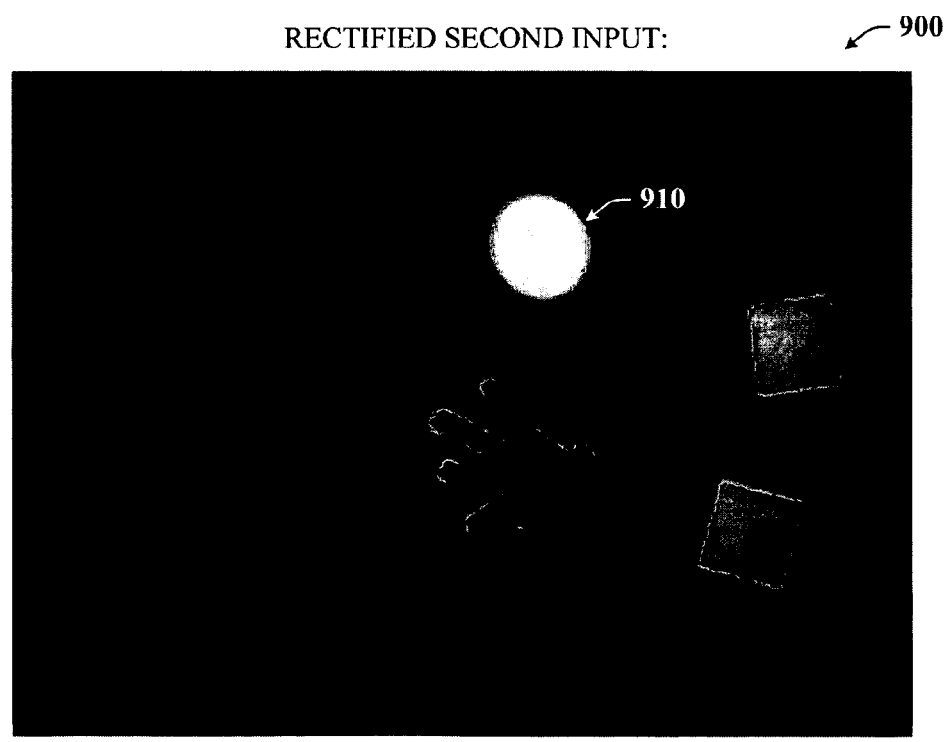
FIG. 9 is an actual, exemplary rectified image—second image as acquired from a second camera—in accordance with an aspect of the present invention.
Figure 10:
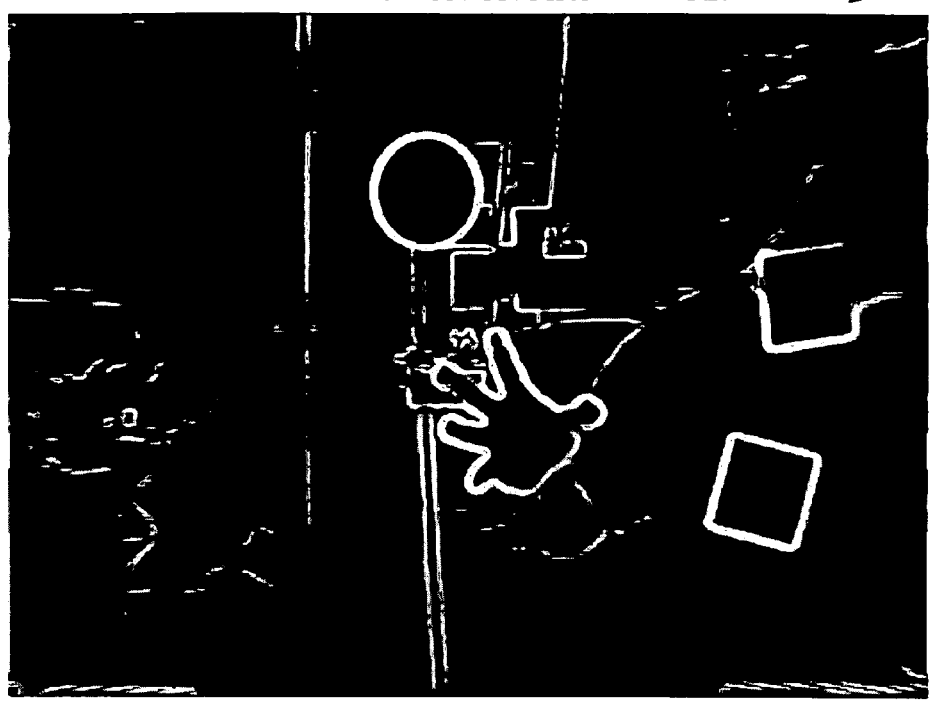
FIG. 10 is an actual, exemplary illustration of edge detection applied to the first input image in accordance with an aspect of the present invention.
Figure 11:
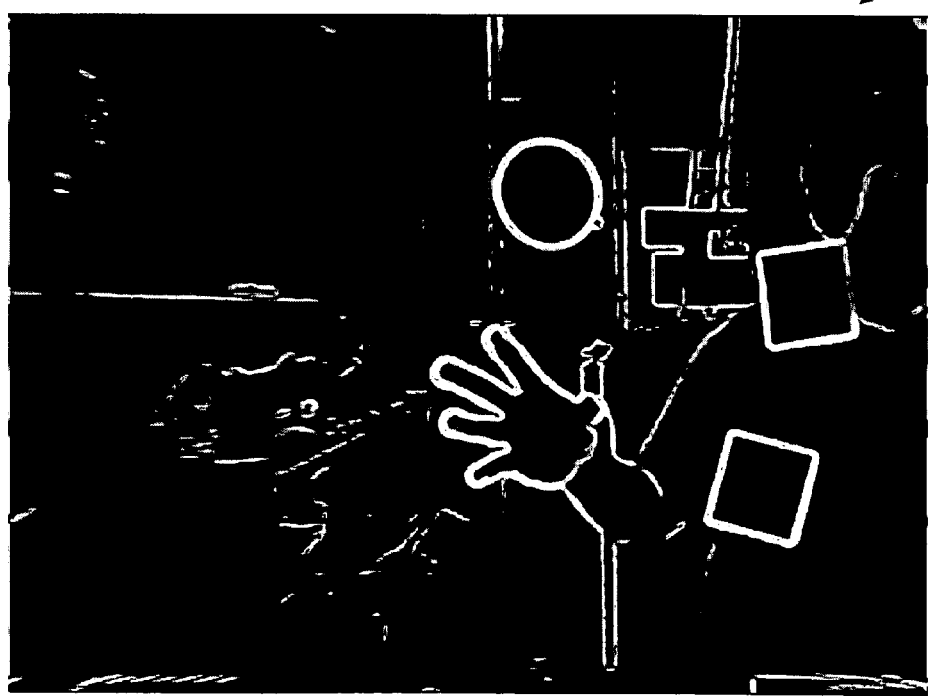
FIG. 11 is an actual, exemplary illustration of edge detection applied to the second input image in accordance with an aspect of the present invention.
Figure 12:
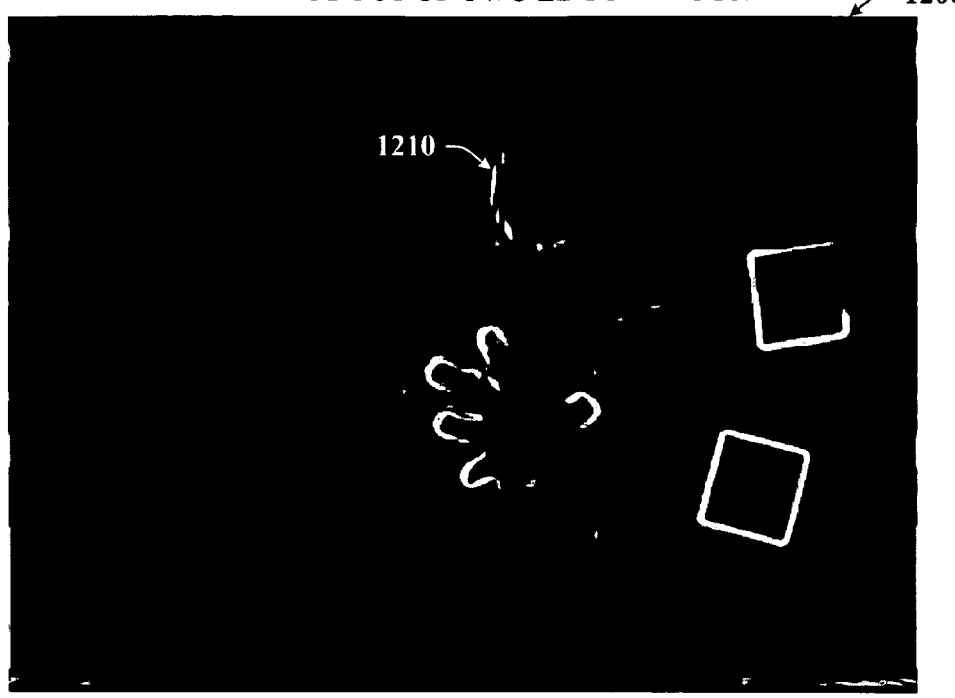
FIG. 12 is an actual, exemplary illustration of an image resulting from the multiplication of images depicted in FIGS. 10 and 11 in accordance with an aspect of the present invention.

In FIGS. 8 and 9, the images 600, 700 have been rectified and lens distortion has been removed to yield rectified first and second input images 800, 900. In FIGS. 10 and 11, an edge detection technique has been applied to compare the two rectified images 800, 900. As can be seen, the edges of the objects (e.g., square objects) as well as the user's hand are substantially illuminated and readily identifiable. Circular objects 810 and 910 in FIGS. 8 and 9, respectively, are reflections of a lamp (e.g., IR illuminant). Other edges in the background scene are also apparent, though they are much less distinct in luminosity and in location in the two edge images 1000, 1100. As a result, when the images 1000, 1100 are multiplied pixel-wise, a product 1200 of the two edge images showing only the "matching" objects is displayed to the user. That is, the user's fingertips (cupped hand with fingers contacting the display surface of plane) as well as the square objects remain in clear view in the output image 1200. The other bits of edges seen in the product image 1200 are accidental alignments of background edges from other parts of the scene (see FIGS. 10 and 11, supra). These accidental alignments are rather weak as evidenced by the lack in form of a strong continuous contour. For example, notice that the circle 1210 in FIG. 12 appears to be no stronger than the hand off the surface in FIG. 13. This is due in part to the non-accidental alignment of edges. That is, it is rare for two edges from two images to align accidentally.

Figure 13:
FIG. 13 is an actual, exemplary image of a user's hand laid flat on a sensing plane or screen to demonstrate edge or contour detection (differencing) in accordance with an aspect of the present invention.
Figure 14:
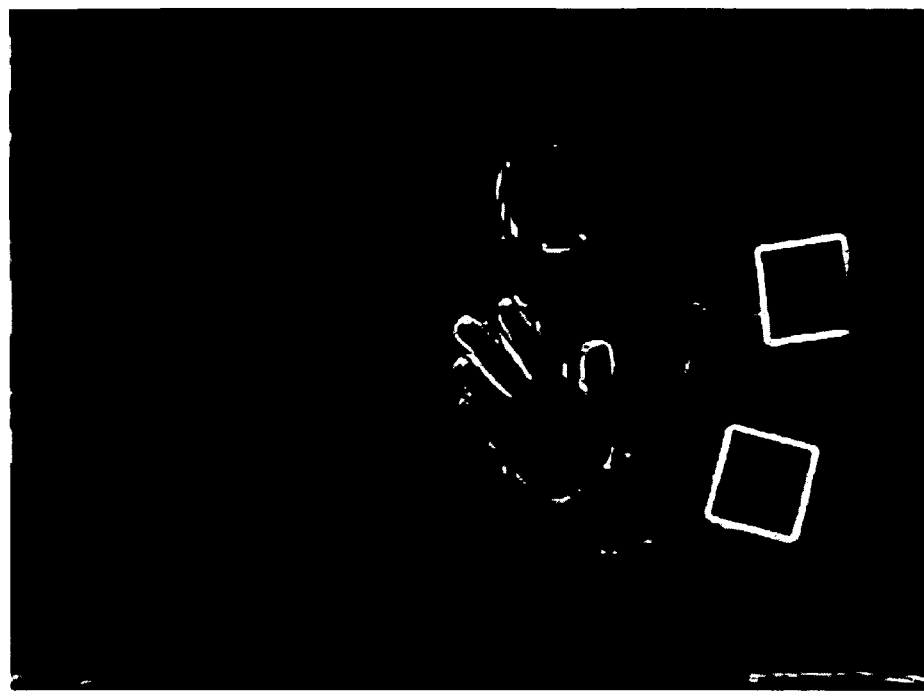
FIG. 14 is an actual exemplary image of a user's hand positioned about 1 to 1.5 inches from the sensing screen or plane to demonstrate edge or contour detection (differencing) in accordance with an aspect of the present invention.
Figure 15:
FIG. 15 is an actual exemplary image of a user's hand positioned about 6 inches from the sensing screen or plane to demonstrate edge or contour detection (differencing) in accordance with an aspect of the present invention.

FIGS. 13-15 are additional exemplary views of various objects located at various distances from a display surface or plane and captured by a camera. As can be seen from the figures, the luminosity of the edges of the user's hand becomes progressively less and less as the distance between the user's hand and the display surface increases.

FIG. 16 depicts a pictorial sequence 1600 of image processing steps in accordance with an aspect the present invention. Using a similar configuration as described in FIGS. 2, 5, and 6-12, supra, the following images are captured in an office with normal indoor lighting using a Sobel edge filter on the rectified images: raw input from both cameras is shown at 1610; input after lens distortion correction, showing display geometry during calibration is illustrated at 1620; (rectified) input after perspective correction to rectify both views to display is represented at 1630; and image product shows only the objects that are very near the display is shown at 1640. The hand on the left is placed flat on the display, and the hand on the right is slightly cupped, with the tips of the fingers contacting the display, and the surface of the palm above or in front of the display. The example shown in 1610-1640 of this figure primarily is meant to show combining the images using a simple pixel-wise product (1640) which is perfectly usable as-is for many applications.

As a further illustration, 1650 demonstrates what one of the previous images (1630 left image) looks like after Sobel edge detection. The 1630 right image after Sobel edge detection is not shown. Image 1660 shows the result of combining or multiplying pixel-wise the (1630, left) edge detection image 1650 and 1630, right edge detection image (not shown). As can be seen, the image 1650 still includes many other edges while the image 1660 primarily depicts only what is on the surface of the display plane.

Figure 17:
FIG. 17 illustrates three different projected visualizations of exemplary touch images in accordance with an aspect of the present invention.
Figure 17:
Figure 17:

Moving forward, FIG. 17 shows three different visualizations of exemplary touch images as they are each projected back to the user. Touch image 1710 shows the user's hand on the surface, which displays both left and right undistorted views composited together (not a simple reflection of two people in front of the display). This demonstrates how an object fuses as it gets closer to the display. Touch image 1720 shows a hand on the surface, which displays the computed touch image. Note that because of the computed homography, the image of the hand indicated by bright regions is physically aligned with the hand on the screen. Presently, explorations into the possibilities in interpreting the touch image have only begun.

Touch 1730 illustrates an interactive drawing program that adds strokes derived from the touch image to a drawing image while using a cycling color map. Many traditional computer vision algorithms may be used to derive features relevant to an application. For example, it is relatively straightforward to determine the centroid and moments of multiple objects on the surface, such as hands. One approach is to binarize the touch image, and compute connected components to find distinct objects on the surface (see Horn, B.K.P, *Robot Vision*, MIT Press, Cambridge, MA, 1986). Such techniques may also be used to find the moments of object shapes, from which may be determined a dominant orientation. Further analysis such as contour analysis for the recognition of specific shapes and barcode processing are possible.

A number of mouse emulation algorithms have been implemented as well which rely on simple object detection and tracking. In one instance, the topmost object of size larger than some threshold can be determined from a binarized version of the touch image. The position of this object determines the mouse position, while a region in the lower left corner of the display functions as a left mouse button: when the user puts their left hand on the region, this is detected as a sufficient number of bright pixels found in the region, and a left mouse button down event is generated. When the bright mass is removed, a button up event is generated. Elaborations on this have been generated, including looking for a bright mass just to the right of the tracked cursor object to detect left and right button down events when the second mass is near and far from the first, respectively.

Finally, a microphone rigidly attached to the display can be utilized to detect "knocking" events. That is, when the user taps the display with their knuckle or hand, this is detected by finding large peaks in the digitized audio signal. This can be used to simulate clicks, generate "forward" or "next slide" events, and so on. Note that while the tap detector determines that a tap event occurred, the touch image may be used to determine where the event occurred. For example, a tap on the left side of the screen may generate a "previous" event, while a tap on the right a "next" event. This contrasts with the tap detector in J.A. Paradiso, C.K. Leo, N. Checka, K. Hsiao, Passive Acoustic Knock Tracking for Interactive Windows, in ACM Conference on Human Factors in Computing: CHI 2002, (2002), 732-733, for example.

Various methodologies in accordance with the subject invention will now be described via a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 18:
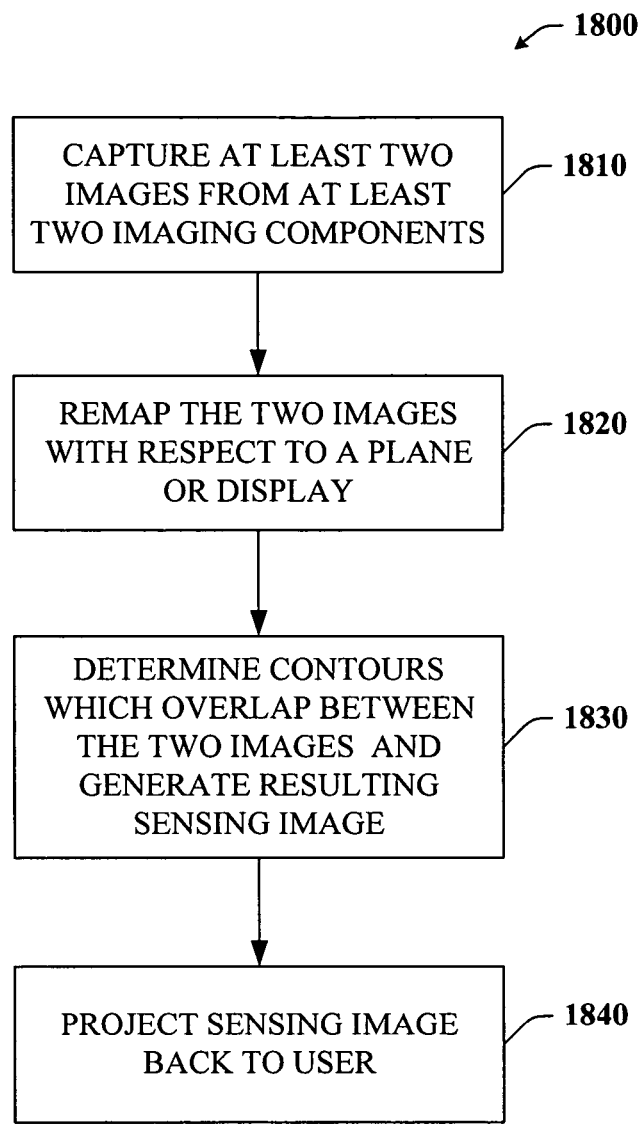
FIG. 18 is a flow diagram illustrating an exemplary process that facilitates image sensing in accordance with an aspect of the present invention.

Referring now to FIG. 18, there is illustrated a high level flow diagram of an exemplary imaging process 1800 to obtain a sensing image in accordance with the present invention. In general, the process 1800 includes capturing at least two input images from at least two imaging components at 1810. Alternatively, one imaging component can be employed in conjunction with IR illumination; however, the image return is not as precise as when two imaging components are employed. Thus, at least two cameras should be used to increase the precision of touch. The number of cameras may be increased to further reduce the likelihood of the accidental alignment of edges. Back to the above discussed example of the circle, if there were a third camera, one could process its output in a similar way and combine the three rectified, edge detected images, and then the bits of noise around the circle would be greatly reduced. In practice, for instance, the system or user can detect and determine where on a printed page the most desired content is located, and then trigger the third very high resolution camera to take a snapshot. This third camera can employ high color resolution in the visible spectrum. As a result, content on the page can be visualized to the user. Other applications include reading or scanning bar codes as well as other content where detailed viewing is desired.

Still referring to FIG. 18, the process 1800 can continue with remapping the two input images with respect to a plane or display at 1820. Remapping can include aligning each of the four corners of each image to the corresponding four corners of the plane or display. In addition, artifacts introduced by the cameras such as lens distortion can be removed or minimized. Following at 1830, the contours of each input image that overlap in the two images can be determined. This can be accomplished in part by applying an edge detection filter to each remapped image.

These overlapping contours indicate objects which are in contact with the sensing plane. This relies on two principles: the concept of binocular disparity and the non-accidental alignment of contours taken from multiple views of real world scenes. Given that two views of the same object are examined, binocular disparity states that the displacement of the object from one view to the other is related to the depth of the object. With respect to the image processing operation described above, the remapping of the two images to the plane region confirms that an object at the sensing plane depth will have zero displacement from one view to the other. Objects beyond the sensing plane will be displaced an amount that is related to its depth and to the distance between the two cameras (e.g., baseline).

According to the non-accidental alignment of contours taken from multiple views, if a contour is found on an object at the sensing plane depth, it is unlikely to strongly match to some other contour corresponding to some other object in the other view of the scene. Thus, if a strong contour is seen in the image that is the result of multiplying the two edge images (edge maps), it can be reasonably certain that there is an object on the sensing plane. Note that certain kinds of objects can confuse this technique: for example, striped patterns or other repeating patterns break the assumption on which the technique relies.

Once the sensing image is obtained at 1840, further processing may be done to locate the regions in the image that correspond to objects on the plane. This may be useful for certain applications that require cursor control, for example. It should be appreciated that other techniques can be employed in the contour determination phase so long as the contours of the objects in the scene are highlighted.

Figure 19:
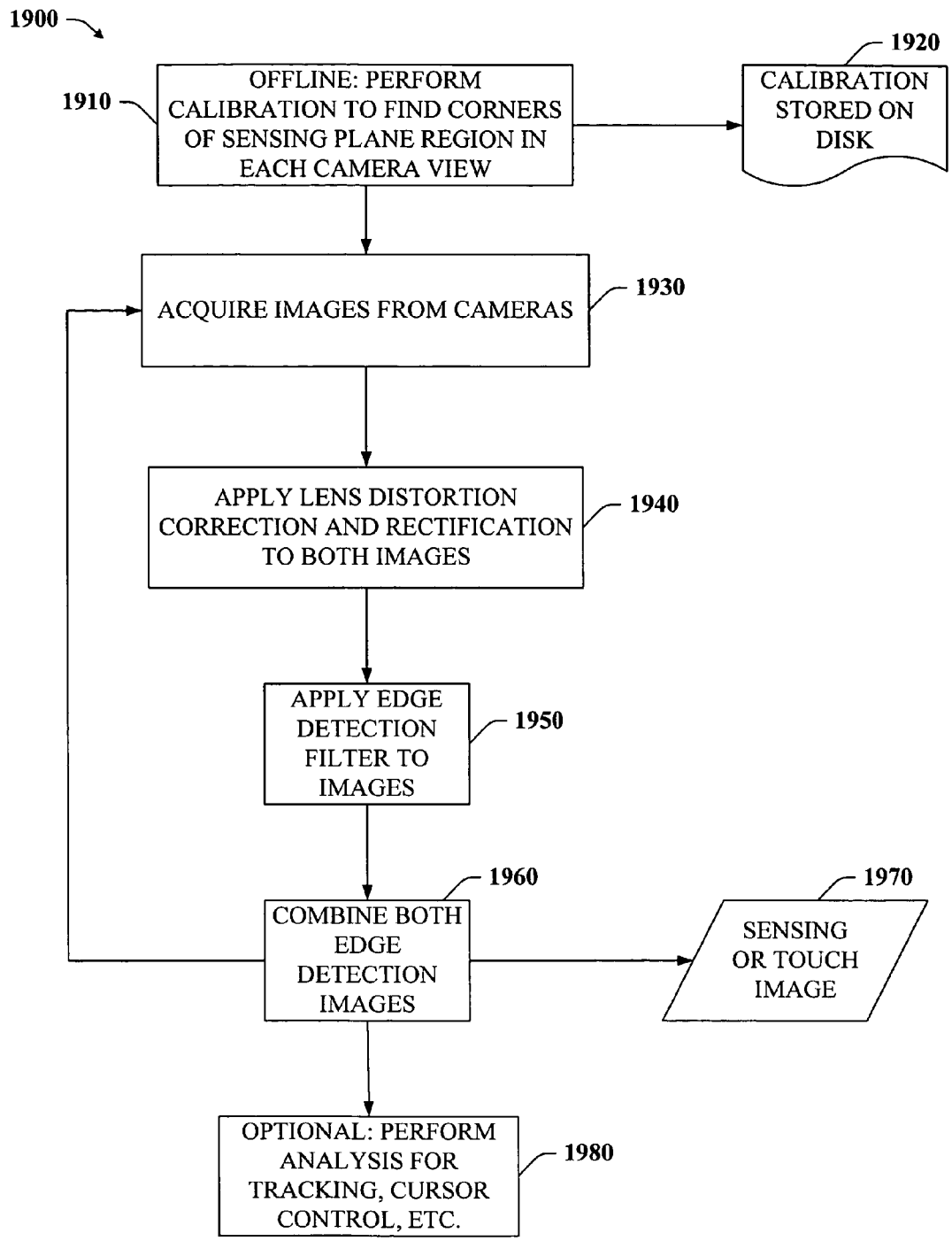
FIG. 19 is a flow diagram illustrating an exemplary process that facilitates generating a touch image in accordance with an aspect of the present invention.

FIG. 19, there is illustrated a flow diagram of an exemplary image processing method 1900 that facilitates gesture-based interaction. The method 1900 initially involves performing calibration offline to find the corners of a sensing plane in each camera view at 1910. The calibration data can be stored on disk at 1920. Following calibration, at least first and second images can be acquired from at least two cameras, respectively, at 1930. In particular, the cameras are directed toward a sensing plane or display screen, upon which one or more objects are located on or near the plane or screen and in view of the cameras.

At 1940, lens distortion correction and rectification can be applied to both images to accomplish at least one remapping of the images. Rectified images result from the performance of these techniques. Subsequently, an edge detection filter can be applied to both rectified images at 1950. At 1960, the at least two images can be combined to yield a sensing image 1970. The method 1900 can then continue to acquiring more images at 1930 to repeatedly project desired images back to the user based on the user's gesture-based interaction with the sensing plane or display screen. At 1980, optional tracking processes can be performed such as for cursor control and the like.

Figure 20:
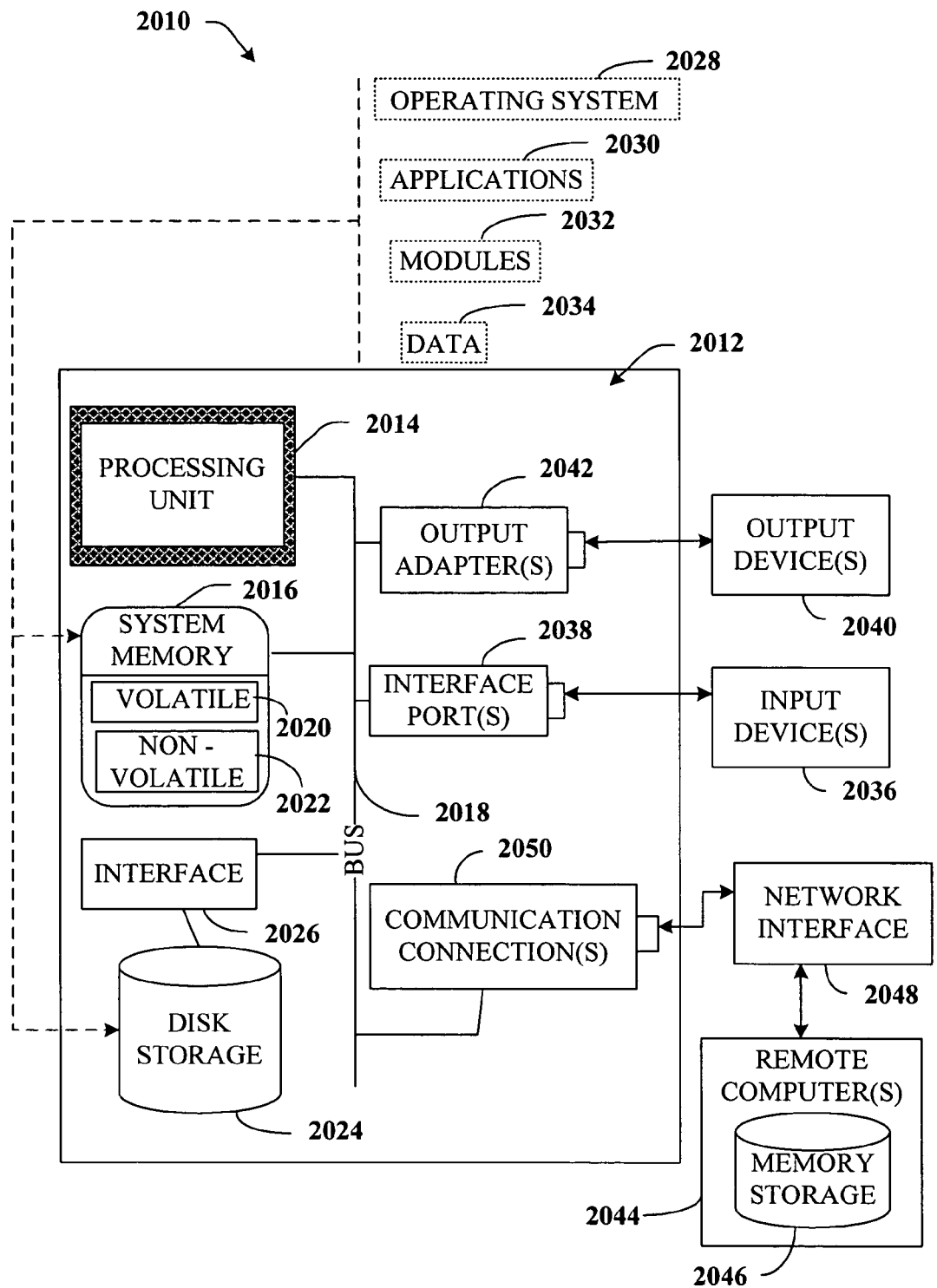
FIG. 20 illustrates an exemplary environment for implementing various aspects of the invention.

In order to provide additional context for various aspects of the present invention, FIG. 20 and the following discussion are intended to provide a brief, general description of a suitable operating environment 2010 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 2010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 20, an exemplary environment 2010 for implementing various aspects of the invention includes a computer 2012. The computer 2012 includes a processing unit 2014, a system memory 2016, and a system bus 2018. The system bus 2018 couples system components including, but not limited to, the system memory 2016 to the processing unit 2014. The processing unit 2014 can be any of various available processors. Dual microprocessors and other multiprocessor architectures also can be employed as the processing unit 2014.

The system bus 2018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 2016 includes volatile memory 2020 and nonvolatile memory 2022. The basic input/output system (BIOS), containing the basic routines to transfer information between elements within the computer 2012, such as during start-up, is stored in nonvolatile memory 2022. By way of illustration, and not limitation, nonvolatile memory 2022 can include read only memory (ROM), programmable ROM (PROM), electrically programmable ROM (EPROM), electrically erasable ROM (EEPROM), or flash memory. Volatile memory 2020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2012 also includes removable/nonremovable, volatile/nonvolatile computer storage media. FIG. 20 illustrates, for example a disk storage 2024. Disk storage 2024 includes, but is not limited to, devices like a magnetic disk drive, floppy disk drive, tape drive, Jaz drive, Zip drive, LS-100 drive, flash memory card, or memory stick. In addition, disk storage 2024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2024 to the system bus 2018, a removable or non-removable interface is typically used such as interface 2026.

It is to be appreciated that FIG. 20 describes software that acts as an intermediary between users and the basic computer resources described in suitable operating environment 2010. Such software includes an operating system 2028. Operating system 2028, which can be stored on disk storage 2024, acts to control and allocate resources of the computer system 2012. System applications 2030 take advantage of the management of resources by operating system 2028 through program modules 2032 and program data 2034 stored either in system memory 2016 or on disk storage 2024. It is to be appreciated that the present invention can be implemented with various operating systems or combinations of operating systems.

A user enters commands or information into the computer 2012 through input device(s) 2036. Input devices 2036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2014 through the system bus 2018 via interface port(s) 2038. Interface port(s) 2038 include, for example, a serial port, a parallel port, a game port, and a universal serial bus (USB). Output device(s) 2040 use some of the same type of ports as input device(s) 2036. Thus, for example, a USB port may be used to provide input to computer 2012, and to output information from computer 2012 to an output device 2040. Output adapter 2042 is provided to illustrate that there are some output devices 2040 like monitors, speakers, and printers among other output devices 2040 that require special adapters. The output adapters 2042 include, by way of illustration and not limitation, video and sound cards that provide a means of connection between the output device 2040 and the system bus 2018. It should be noted that other devices and/or systems of devices provide both input and output capabilities such as remote computer(s) 2044.

Computer 2012 can operate in a networked environment using logical connections to one or more remote computers, such as remote computer(s) 2044. The remote computer(s) 2044 can be a personal computer, a server, a router, a network PC, a workstation, a microprocessor based appliance, a peer device or other common network node and the like, and typically includes many or all of the elements described relative to computer 2012. For purposes of brevity, only a memory storage device 2046 is illustrated with remote computer(s) 2044. Remote computer(s) 2044 is logically connected to computer 2012 through a network interface 2048 and then physically connected via communication connection 2050. Network interface 2048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2050 refers to the hardware/software employed to connect the network interface 2048 to the bus 2018. While communication connection 2050 is shown for illustrative clarity inside computer 2012, it can also be external to computer 2012. The hardware/software necessary for connection to the network interface 2048 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   one or more processors;
   one or more memories;
   at least one sensing plane positioned in space to receive input from one or more users that are interacting with the at least one sensing plane;
   a detection component, maintained on the one or more memories and executable by the one or more processors, to detect one or more dimensions of a first input image and a second input image received from a first imaging component and a second imaging component, respectively, and to render a touch image, the touch image comprising a combination of the at least first and second input images, wherein each of the first and second input images include at least part of the received input from the one or more users;
   an edge-detection filter that is applied to at least the first and second input images to highlight one or more edge contours of the first and second input images, respectively, to thereby yield a first and a second edge image; and
   a pixel-wise comparison component, maintained on the one or more memories and executable by the one or more processors, to perform pixel-wise multiplication of the first and second edge images to render the touch image by identifying where the one or more edge contours of the first and second edge images overlap while excluding background objects that fail to align in the first and second edge images,
   wherein:
   the detection component is further executable by the one or more processors to identify, using the touch image, the one or more users that are interacting with the at least one sensing plane; and
   the first input image or the second input image includes data from one or more other users and the detection component is further executable by the one or more processors to determine that the one or more other users are not interacting with the at least one sensing plane and thereby the one or more other users are not in the touch image.

2. The system of claim 1, further comprising:
a component that removes one or more effects of lens distortion from at least one of the first or second input images; and
a rectification component that resolves one or more first parameters of the at least one sensing plane with one or more second parameters of at least one of the first or second input images.

3. The system of claim 2, wherein the first and second parameters are collected offline and stored.

4. The system of claim 2, wherein the first parameters comprise measurements corresponding to four corners of the at least one sensing plane.

5. The system of claim 2, wherein the second parameters comprise measurements corresponding to four corners of at least one of the first or second input images.

6. The system of claim 2, wherein the rectification component transforms the first input image and the second input image such that physical points therein refer to same physical points on the at least one sensing plane.

7. The system of claim 1, wherein a presence of overlapping edge contours indicates that at least one input object is in contact with the at least one sensing plane.

8. The system of claim 1, wherein the first and second imaging components comprise at least one of a video camera and a still camera.

9. The system of claim 1, wherein a surface of the at least one sensing plane facing the one or more users is not active for interaction to allow calibration offline of the first and second imaging components.

10. The system of claim 1, wherein the of one or more users are positioned opposite of the first and second imaging components on an other side of the at least one sensing plane.

11. The system of claim 1, wherein the at least one sensing plane is located vertically or horizontally with respect to the one or more users and the first and second imaging components.

12. The system of claim 1, further comprising a block matching component that examines patterns of objects to determine whether overlap exists between the first and second input edge images.

13. The system of claim 1, further comprising an IR (infrared) component that employs IR illumination to identify IR reflective objects on or near the at least one sensing plane to determine overlap between the first and second edge images.

14. The system of claim 13, further comprising an IR (infrared) illuminant placed behind the at least one sensing plane and on a same side of the first and second imaging components to illuminate the at least one sensing plane surface evenly, IR pass-filters that can be applied to a lens of each of the first and second imaging components, and an IR cut-filter applied to a projector.

15. The system of claim 1, further comprising a calibration component that manually calibrates parameters of the first and second input images and the at least one sensing plane with respect to current positions of the first and second imaging components for offline storage.

16. The system of claim 1, wherein the detection component identifies the one or more users through application of facial recognition.

17. The system of claim 1, wherein the detection component identifies the one or more users through application of facial tracking.

18. A method comprising:
acquiring first and second input images of one or more users interacting with a sensing plane from first and second imaging components, respectively;
determining edge contours of the first and second input images to yield first and second highlighted edge images based at least in part on features of the one or more users interacting with the sensing plane;
performing pixel-wise multiplication of the first and second highlighted edge images to render a touch image by identifying where the edge contours of the first and second highlighted edge images overlap while excluding background objects that fail to overlap in the first and second highlighted edge images; and
recognizing each of the one or more users interacting with the sensing plane based on the first and second highlighted edge images, wherein the first input image or the second input image includes data from one or more other users not interacting with the sensing plane and thereby the data from the one or more other users is not part of the touch image.

19. The method of claim 18, wherein the sensing plane is a non-diffuse sensing plane positioned in space to receive input from the one or more users; and
the first and second imaging components are positioned to face toward the non-diffuse sensing plane on a side opposite from the one or more users.

20. The method of claim 18, further comprising:
removing lens distortion from the first and second input images; and
warping the first input image and the second input image individually to the sensing plane to obtain a one-to-one correspondence of physical points between each input image and the sensing plane.

21. The method of claim 20, wherein the removing the lens distortion and the warping are performed at a same time.

22. The method of claim 18, wherein the determining the edge contours of the first and second input images comprises applying an edge detection filter to the first and second input images.

23. The method of claim 18, further comprising projecting the touch image back to the one or more users in real-time.

24. The method of claim 18, further comprising:
calibrating the sensing plane in each current imaging component view to find corner parameters of the sensing plane; and
storing calibration data offline.

25. The method of claim 24, further comprising repeating calibration of the sensing plane when the first imaging component or the second imaging component switches from its current imaging component view.

26. The method of claim 18, wherein the first and second imaging components comprises cameras.

27. The method of claim 18, further comprising analyzing location of objects in the touch image to track objects or cursor control.

28. The method of claim 18, further comprising normalizing the touch image to remove effects due to non-uniformity of illumination in a pixel-wise manner.

29. The method of claim 18, further comprising arbitrarily defining the sensing plane to coincide with a display screen.

30. The method of claim 18, further comprising mounting at least a third imaging component that is triggered to take a high resolution snapshot of at least a portion of object(s) in the sensing plane to visualize greater detail of the object(s).

31. The method of claim 30, wherein the at least the third imaging component comprises a camera having higher resolution than the first and second imaging components.

32. A memory having stored thereon computer-executable instructions to perform the method of claim 18.

33. A system comprising:
a processor;
a memory, coupled to the processor, storing:
   a first component, operable by the processor, to acquire at least first and second input images from first and second imaging components, respectively;
   a second component, operable by the processor, to remap the first and second input images with respect to a sensing plane;
   a third component, operable by the processor, to determine and highlight edge contours of the first and second input images to yield first and second highlighted images; and
   a fourth component, operable by the processor, to combine the first and second highlighted images to obtain a touch image that includes first data associated with edge contours that align after the combining and that excludes second data associated with edge contours that do not align after the combining, the first data being associated with one or more users interacting with the sensing plane and the second data being associated with one or more other users not interacting with the sensing plane.

34. The system of claim 33, further comprising a fifth component, operable by the processor, to position the first and second imaging components to face toward the sensing plane on a side opposite from the one or more users.

35. The system of claim 33, wherein the sensing plane is at least partially transparent.

36. The system of claim 33, wherein the second component is further operable by the processor to:
remove lens distortion from the first and second input images; and
warp the first input image and the second input image individually to the sensing plane to obtain a one-to-one correspondence of physical points between each input image and the sensing plane.

* * * * *